Feb. 11, 1969  W. C. GASSAWAY  3,427,434
BEARING HEATER
Filed July 15, 1966  Sheet 2 of 2

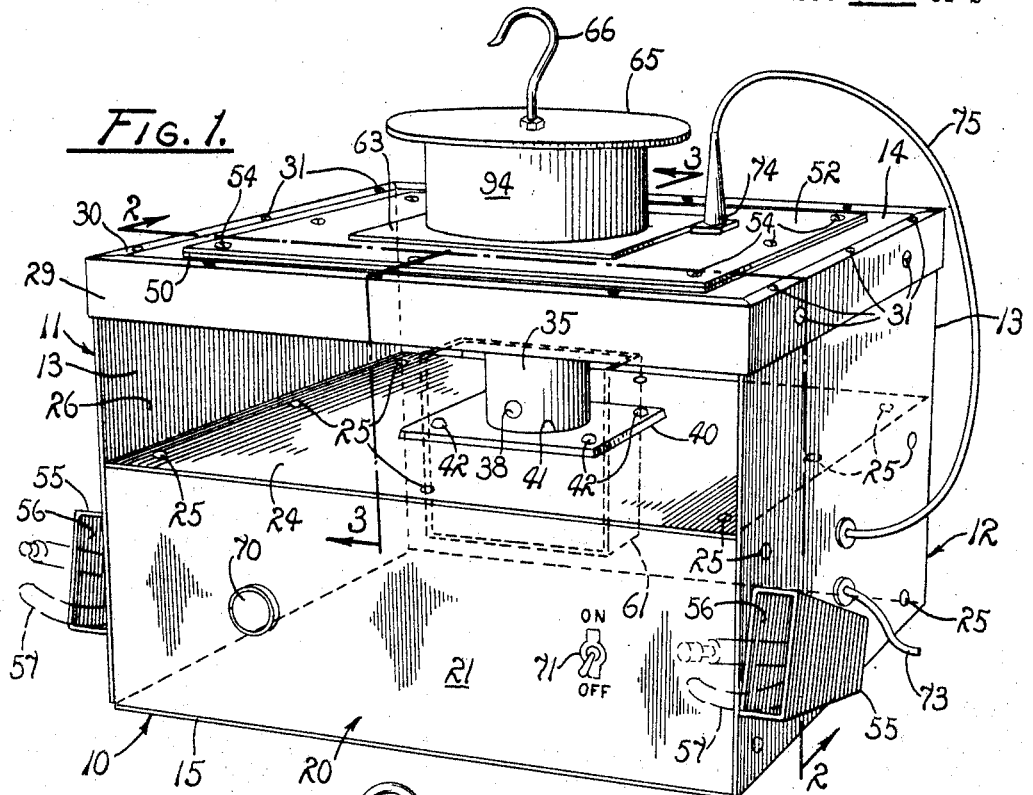

WILSON C. GASSAWAY
INVENTOR

Huebner & Worrel
ATTORNEYS

United States Patent Office 3,427,434
Patented Feb. 11, 1969

3,427,434
BEARING HEATER
Wilson C. Gassaway, 1585 W. Keats,
Fresno, Calif. 93705
Filed July 15, 1966, Ser. No. 565,614
U.S. Cl. 219—385      9 Claims
Int. Cl. F27d *11/00;* B23p *11/02*

ABSTRACT OF THE DISCLOSURE

Device for heating an annular bearing to facilitate mounting thereof including a frame vertically mounting a conduit having an open upper end and an air intake at its lower end, a heater in the conduit, a metal plate extending horizontally outwardly from the upper end of the conduit, an asbestos sheet between the plate and the frame, frusto-conical plates for supporting the bearings coaxially of the conduit, an asbestos cap for directing heated air laterally, and a thermostatic control magnetically attachable to the metal plate a predetermined distance from the conduit.

---

The present invention relates to a device for heating bearings and more particularly to such a device which makes possible the even and controlled heating of bearings in order to facilitate their mounting.

It is recognized that the device of the present invention has application to the heating of annular members generally; however, it was developed in solution of certain problems encountered in the heat expansion of bearings and, for illustrative convenience, is shown and described in such connection.

Garages and repair shops of various types, as well as vehicle assembly plants, experience a common problem in the assembling of motors, automotive vehicles, and other mechanical devices having ball bearings, roller bearings and the like. In such bearings, it is necessary for the inner races thereof snugly to fit their respective shafts for dependable positioning and to avoid rotation of the inner races on their shafts. It is, therefore, customary to machine such shafts and bearings for snug fit. Because of even slight size variations, the inner races frequently refuse to slide into place on their shafts or go on easily but are then too loose.

There are several procedures which are commonly employed to minimize these difficulties. These procedures are, however, unsatisfactory for a variety of reasons. The most obvious and perhaps least satisfactory is simply to force the bearings into position about their shafts by means of pressure or driving operations. This procedure is objectionable since it frequently damages the bearings. Furthermore, there is danger of scoring the shafts or having the bearing become locked thereon because of improperly applied force.

A second procedure is to heat the bearings in hot oil before trying to position them in order to cause the metal to expand causing the internal diameter of the inner race to enlarge slightly. This is usually successful in that the bearings can be evenly heated and properly positioned on their shafts. It is to be understood that when a newly positioned bearing cools it returns to its normal dimensions thus contracting properly on its shaft. However, this method is somewhat less than satisfactory since obviously the handling of the oil is inconvenient, time consuming and somewhat dangerous.

A third procedure is to heat the bearings with a blow torch or similar instrument to cause the bearings to expand, as in the second procedure. This method is also less than satisfactory since it is difficult if not impossible evenly to heat the bearings by such means. Therefore, the expansion of the bearings is usually uneven causing stresses which can cause permanent damage. Furthermore, because of the great heating capacity of a blow torch, there is danger of overheating the bearing causing recrystallization of the metal thus interfering with its designed structural characteristics.

Therefore, it is an object of the present invention to provide a bearing heater which makes possible the improved heating of bearings in order to facilitate the mounting thereof.

Another object is to provide such a bearing heater which permits the even and controlled heating and expansion thereof.

Another object is to provide such a bearing heater which can heat bearings of various sizes without inconvenient adjustment or preconditioning.

Another object is to provide such a bearing heater which indicates when a bearing thereon is properly heated.

Another object is to provide such a bearing heater which is easily portable for movement to the work area.

Another object is to provide such a bearing heater which heats bearings by conventional heat transmission.

Another object is to provide such a bearing heater which is designed to prevent grease or oil contained in the bearings from dripping onto the working parts of the device.

Another object is to provide such a bearing heater which is of sturdy construction and is thus able to withstand rough treatment in everyday use.

Another object is to provide such a bearing heater which is inexpensive to construct and to operate.

Still further objects and advantages of the present invention are to provide improved elements and arrangements thereof in an apparatus for the purposes set forth, which is fully effective in achieving its intended purposes.

These, together with other objects and advantages of the present invention, will become more fully apparent upon reference to the following description in the specification and accompanying drawings.

In the drawings:

FIG. 1 is a perspective of a bearing heater incorporating the principles of the present invention.

FIG. 2 is a transverse vertical section taken on line 2—2 of FIG. 1.

Figure 3:
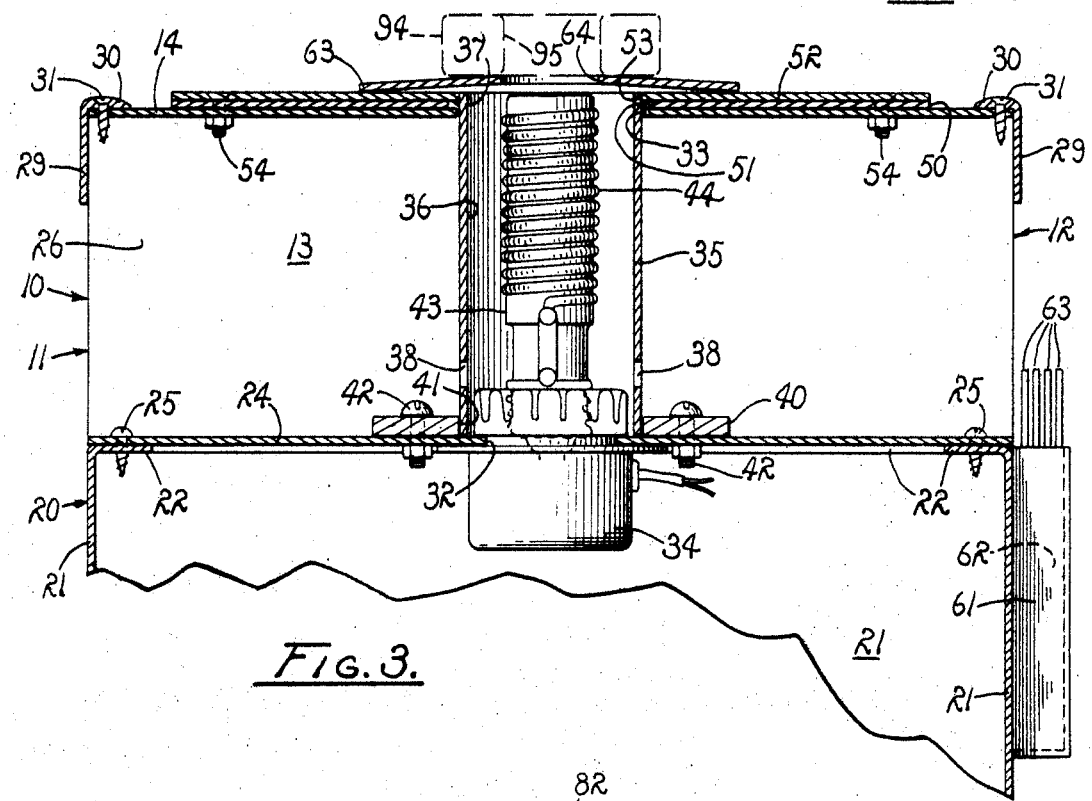
FIG. 3 is a fragmentary longitudinal vertical section taken on line 3—3 of FIG. 1.

Referring more particularly to the drawings, a bearing heater embodying the principles of the present invention is generally indicated by the numeral 10. The bearing heater provides a rigid rectangular metal frame 11. The frame includes a rectangular outer structure 12 having parallel opposite side walls 13, an integral top wall 14 which is normal to and between the side walls, and a bottom wall 15 which is parallel to the top wall. A rectangular enclosure 20, having four integral sides 21, is mounted in the outer structure so that two of its opposite sides are positioned against the opposite side walls 13 thereof and it rests on the bottom wall of the outer structure, as best shown in FIG. 2. Each side has an upper mounting flange 22 and a lower mounting flange 23 which are bent normal to the side walls and extend toward the center of the enclosure. A rectangular mounting plate 24 is affixed on the upper mounting flanges of the enclosure between the opposite side walls of the outer structure. The outer structure, enclosure, and mounting plate are held in assembly forming a box-like structure by means of screws 25 as best shown in FIG. 2. The top wall and opposite side walls of the outer structure and the mounting plate define a ventilation passageway 26. Four rubber rests 27 are attached in spaced relation to the side of the bottom wall 15 farthest from the enclosure. A rectangular edge plate 29, having a rolled upper edge 30, is peripherally mounted about the top wall of the outer structure, as best shown in FIGS. 1 and 2. A plurality of screws 31 hold the edge plate in position.

A circular heating unit opening 32 of predetermined size is centrally provided in the mounting plate 24 of the metal frame 11. A somewhat larger circular opening 33 is centrally provided in the top wall 14 of the outer structure 12 in vertical alignment with the heating unit opening. An electric socket 34 is mounted, as by welding, on the mounting plate within enclosure 20 in alignment with the heating unit opening, as best shown in FIG. 3. A cylindrical metal conduit or shroud 35, having an outer diameter slightly smaller than that of opening 33 and a cylindrical passageway 36 therein, is mounted, as by welding, normal to and between the top wall of the outer structure and the mounting plate 24 within the ventilation passageway 26 circumferentially above the heating unit opening and extending a short distance through the opening 33. The shroud also has an upper discharge end 37 and a pair of aligned inlets 38 adjacent to the mounting plate which define an axis parallel to the opposite side walls of the outer structure. A rectangular asbestos insulating pad 40, having a circular shroud opening 41, is positioned with the shroud received through its shroud opening and resting on the mounting plate. The insulating pad is held in position by bolts 42.

Any suitable heating unit 43 is removably mounted in the electric socket 34 and extends through the heating unit opening 32 axially throughout substantially the entire length of the passageway 36. The heating unit has a helical heating coil 44 operably mounted thereon. A rectangular asbestos sheet 50, having an opening 51 therein of the same diameter as the opening 33 is positioned on the top wall 14 of the outer structure 12 with the shroud extending through its opening. A rectangular temperature plate 52 of the same dimensions as asbestos sheet 50 and having an opening 53 therein of the same diameter as opening 51, is positioned above and in alignment with the asbestos sheet with the discharge end of the shroud extending through its opening. The asbestos sheet and temperature plate are held in position on the top wall by means of bolts 54.

A pair of metal boxes 55, having interiors 56, are mounted, as by welding, on the exteriors of the opposite side walls 13 of the outer structure 12, as shown in FIG. 1. A pair of pliers 57 is shown received in the interior of each box. A rectangular plate box 61, having interior 62, is mounted, as by welding, on a side 21 of the enclosure which is normal to the opposite side walls of the outer structure. A plurality of bearing plates 63 of a slightly truncated cone-like configuration of a variety of sizes and having circular openings 64 of a variety of diameters are removably received in the interior of the plate box. A rigid asbestos lid 65 is provided with the device of the present invention and is intended to be positioned, as shown in FIGS. 2 and 3. The lid has a grasping hook 66 affixed thereto.

A warning light 70 and a toggle switch 71 are mounted on the side 21 of the enclosure 20 opposite to that having the plate box 61 thereon. A transformer 72 is mounted within the enclosure. The transformer has an electric cord 73 operatively connected thereto which is adapted for connection to any suitable source of electrical energy. A magnetized thermostat 74 is magnetically attached to the temperature plate 52 a predetermined short distance from the opening 53 therein. An electric cable 75 operably interconnects the thermostat and the transformer. A relay 80 is mounted within the enclosure adjacent to the transformer. A buzzer mechanism 81 is mounted within the enclosure adjacent to the warning light 70.

Figure 4:
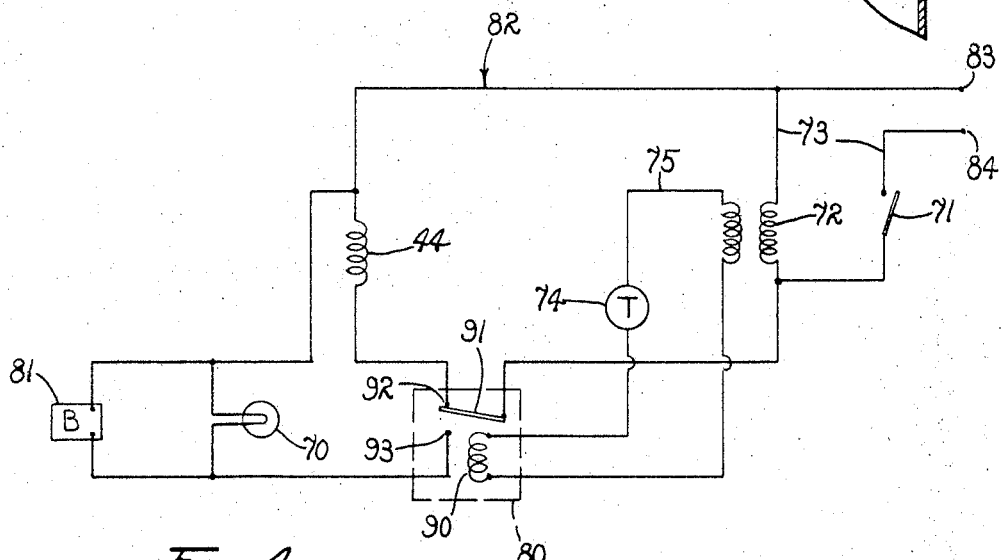
FIG. 4 is a schematic diagram of an electrical control circuit for the bearing heater of the present invention.

The bearing heater 10 is provided with an electrical control circuit 82 which is illustrated in the "off" position in FIG. 4. The circuit is connected to any suitable source of power 83 and 84. The transformer 72 is connected in series with the toggle switch 71 between poles 83 and 84. As shown in FIG. 4, the toggle switch is in the "off" or inoperative position. The relay 80 provides an electromagnet 90 which is connected in series with the thermostat 74 with the secondary of the transformer. The relay also provides a switch 91 which is normally connected in series with the heating coil 44 and is in parallel with the transformer. The switch is adapted to be moved alternately between a contact point 92 which is connected to the heating coil and a contact point 93. The buzzer mechanism 81 and the warning light 70 are connected in parallel with the transformer between the contact point 93 and the pole 83.

By closing toggle switch 71, the heating coil 44 is activated through switch 91 and relay 80. Simultaneously, the thermostat 74 prevents power from flowing to the electromagnet 90. However, when the temperature sensed by the thermostat reaches a predetermined level, the thermostat actuates the relay causing switch 91 to move from contact point 92 to contact point 93. This performs two functions simultaneously. The heating coil is de-energized since its connecting circuit is interrupted through switch 91. However, the circuit is now completed through the buzzer mechanism 81 and the warning light 70. The entire circuit can, of course, at any time be broken or de-energized by again breaking the circuit through the toggle switch. This immediately causes switch 91 to move to its normal position against contact point 92.

*Operation*

The operation of the described embodiment of the subject invention is believed to be readily apparent and is briefly summarized at this point. When it is necessary to mount a bearing, indicated by numeral 94 and having a shaft opening 95, the heater 10 of the present invention can be moved to a position which is most advantageous to perform the operation. Subsequently, the electric cord 73 is "plugged in" to a suitable socket. With the toggle switch 71 in the "off" position, as shown in FIG. 1, the device remains inoperative. A bearing plate 63, of an appropriate relative size in relation to the bearing which is to be mounted, is positioned on the temperature plate 52 in alignment with the discharge end 37 of the shroud 35, as shown in FIG. 3. The bearing is subsequently positioned on the bearing plate with its opening in alignment with the discharge end of the shroud. The asbestos lid 65 is now positioned over the ring bearing, as shown in FIGS. 1 and 2.

The toggle switch 71 is moved to the "on" position, thus completing the electrical control circuit 82 through switch 91 and heating coil 44. Consequently, the heating coil is energized radiating heat therefrom. The radiated heat causes a convectional current of air from the ventilation passageway 26 through the inlets 38 and passageway 36 of shroud 35 past the heating coil. The air moving therethrough, thus, becomes heated to a high temperature and moves rapidly through the discharge end 37 of the shroud 35. With the asbestos lid in position, as described, the heat is forced to radiate outwardly into the ring bearing. This continual movement of heated air, as described, causes a uniform progressive heating of the ring bearing without creating structural stresses therein. Furthermore, the operation of the thermostat 74 prevents the bearing from becoming over heated.

As the ring bearing 94 becomes heated, the bearing plate 63 and the temperature plate 52 are heated by conductive heat transfer to approximately the same temperature as the bearing. Accordingly, when the temperature plate reaches a predetermined temperature, the thermostat allows power to flow from the transformer 72 through the electromagnet 90 of the relay 80. Thus, as described, the switch 91 is caused to move to contact point 93, thus, de-energizing the heating coil and completing the circuit through the buzzer mechanism 81 and the warning light 70. Therefore, the buzzer mechanism sounds and the warning light goes on to indicate to the operator of the bearing heater 10 that the bearing is heated to the desired temperature. Using the pliers 57, the operator then removes the asbestos lid 65 from above the bearing by means of the grasping hook 66. Subsequently, the operator picks up the heated bearing with one or both pliers and is easily able to mount it because of its slightly expanded condition. In order to turn off the buzzer mechanism and the warning light, the operator needs merely to move the toggle switch to the "off" position again, as shown in FIG. 1.

The slightly truncated cone-like configuration of the bearing plates 63 allows oil or grease contained in the bearing 94 to flow away from the circular opening 64 of the bearing plate. This acts to prevent grease or oil from falling onto the heating coil 44 which might cause fire or otherwise inhibit the proper operation of the bearing heater 10. The oil or grease will, of course, flow onto the temperature plate 52 where it can easily be removed. If a large quantity of oil or grease collects there so that some of it flows outwardly onto the top wall 14, the rolled upper edge 30 of the edge plate 29 prevents it from flowing downwardly over the bearing heater. Otherwise the edge plate is intended to add structural rigidity to the device and to absorb the wear of everyday use.

Furthermore, the large ventilation passageway 26, the inlets 38, the passageway 36, the insulating pad 40, and asbestos sheet 50 contribute toward cooling of the metal frame 11 during use and after use. This makes the bearing heater easier to handle and to transport from one work area to another during frequent use.

Utilizing the device of the present invention, ring bearings, and other annular devices, can quickly, easily, and inexpensively be heated to cause expansion thereof in order to facilitate their mounting. Furthermore, there is no danger of recrystallization of the metal of the ring bearings as a result of overheating, or of creating structural strains in the bearings as a result of uneven heating. As described, the device can be used to heat bearings and the like of a wide variety of sizes, thus, making it adaptable for frequent use in an assembly plant or garage where a wide variety of types of bearings are to be mounted. The ability of the device to be easily transported to locations close to the work areas makes for efficient and safe use.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for heating annular members comprising a frame; a conduit mounted substantially vertically in the frame, said conduit having an open upper end; a heating unit mounted in the conduit for heating air and causing it to move convectionally out of the upper end of the conduit; a metal plate extending laterally outwardly from the conduit above the frame; heat sensing means on the plate; and means above the upper end of the conduit for causing the heated air to move laterally outwardly after moving out of the upper end of the conduit.

2. The device of claim 1 wherein said last-named means includes a plate of heat resistant material.

3. The device of claim 2 further including heat insulating material disposed between the plate and the frame.

4. A device for heating annular members, such as circular bearings and the like, comprising a rigid portable frame having an air ventilation passageway therein; a conduit mounted in the frame in communication with the ventilation passageway; a heating unit mounted within the conduit, the conduit having a heat discharge opening; a heated conducting plate extending laterally of the conduit; and an apertured member adapted to receive an annular member to be heated and to dispose it substantially coaxially over the heat discharge opening; said heating unit being operated through an electric circuit connected with a source of electrical energy, and said electric circuit including heat sensing means positionable on the plate a predetermined distance from the heat discharge opening for determining the temperature of the annular member and interrupting the heating unit when the annular member has reached a predetermined temperature.

5. The device of claim 4 wherein the heat sensing means includes magnetic means, and the plate is of magnetically attractable material to hold the sensing means in place thereon.

6. The device of claim 4 wherein a number of apertured members of various sizes are provided for positioning over the heat discharge opening for receiving corresponding bearings of various sizes, and each apertured member slopes outwardly downwardly for directing any grease or oil contained in the bearings away from the heating unit.

7. The device of claim 4 further including means for covering the annular member while it is disposed over the heat discharge opening.

8. The device of claim 7 wherein said last-named means includes a plate of heat resistant material.

9. The device of claim 1 wherein said heat sensing means includes a thermostatic control magnetically attachable to the metal plate a predetermined distance from the conduit.

References Cited

UNITED STATES PATENTS

| | | | |
|---|---|---|---|
| 2,076,485 | 4/1937 | Streysman et al. | 219—366 |
| 2,789,200 | 4/1957 | Ebert | 219—374 X |

BERNARD A. GILHEANY, *Primary Examiner.*

R. N. ENVALL, JR., *Assistant Examiner.*

U.S. Cl. X.R.

219—364, 374; 29—447